US008793576B2

(12) United States Patent
Zimmer et al.

(10) Patent No.: US 8,793,576 B2
(45) Date of Patent: Jul. 29, 2014

(54) SYSTEM AND METHOD FOR COMPUTING A DESKTOP PICTURE

(75) Inventors: Mark Zimmer, Aptos, CA (US); Ralph Brunner, Cupertino, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 728 days.

(21) Appl. No.: 11/251,215

(22) Filed: Oct. 14, 2005

(65) Prior Publication Data

US 2007/0085854 A1   Apr. 19, 2007

(51) Int. Cl.
*G06F 3/00* (2006.01)
*G06F 17/00* (2006.01)
*G06F 3/048* (2013.01)

(52) U.S. Cl.
USPC ............................ 715/275; 715/762; 715/806

(58) Field of Classification Search
USPC ......... 715/867, 764, 765, 775, 243, 273–277, 715/762, 806, 807; 345/441, 582
See application file for complete search history.

(56) References Cited

U.S. PATENT DOCUMENTS

| | | | |
|---|---|---|---|
| 5,490,246 A | | 2/1996 | Brotsky et al. |
| 5,852,443 A | * | 12/1998 | Kenworthy .................... 345/441 |
| 5,930,501 A | * | 7/1999 | Neil .............................. 713/400 |
| 6,006,231 A | | 12/1999 | Popa |
| 6,023,273 A | * | 2/2000 | Cox et al. ...................... 715/764 |
| 6,272,558 B1 | | 8/2001 | Hui et al. |
| 6,597,378 B1 | * | 7/2003 | Shiraishi et al. .............. 715/764 |
| 6,717,599 B1 | | 4/2004 | Olano |
| 7,010,755 B2 | * | 3/2006 | Anderson et al. ............. 715/778 |
| 2002/0118217 A1 | | 8/2002 | Fujiki |
| 2003/0174136 A1 | | 9/2003 | Emberling et al. |
| 2004/0179019 A1 | * | 9/2004 | Sabella et al. ................ 345/537 |
| 2004/0246263 A1 | * | 12/2004 | Cohen et al. .................. 345/582 |
| 2005/0188313 A1 | * | 8/2005 | Matthews et al. ............. 715/741 |
| 2007/0006102 A1 | * | 1/2007 | Walker .......................... 715/867 |

FOREIGN PATENT DOCUMENTS

| | | |
|---|---|---|
| EP | 548 586 | 6/1993 |
| EP | 0 694 879 | 1/1996 |
| EP | 1 383 080 | 1/2004 |
| WO | WO 98/45815 | 1/1998 |
| WO | WO 02/09039 A | 1/2002 |

OTHER PUBLICATIONS

International Search report dated Jul. 27, 2005 (PCT/US 05/008804).

(Continued)

*Primary Examiner* — Omar Abdul-Ali
*Assistant Examiner* — Andrew Tank
(74) *Attorney, Agent, or Firm* — Wong, Cabello, Lutsch, Rutherford & Brucculeri, LLP

(57) ABSTRACT

Disclosed are a system and method for computing a desktop picture. Instead of loading a file that contains the desktop image from memory, the present invention provides for a system and method for opening and retaining a procedural recipe and a small set of instructions that can be executed to compute a desktop picture. The desktop picture can be computed very quickly using a GPU (graphics processing unit), and can be made to move on demand. When a part of the desktop image is needed to composite, that part is computed using a fragment program on the GPU using the procedural recipe and a specially written fragment program into a temporary VRAM buffer. After it is computed and composited, the buffer containing the result of the fragment program may be discarded.

20 Claims, 4 Drawing Sheets

(56) References Cited

OTHER PUBLICATIONS

International Search report dated Aug. 8, 2005 (PCT/US 05/008805).

Haeberli, P. et al, "The Accumulation Buffer: Hardware Support for High-Quality Rendering," Computer Graphics, New York, NY, vol. 24, No. 4, Aug. 1, 1990, pp. 309-318.

\* cited by examiner

SYSTEM AND METHOD FOR COMPUTING A DESKTOP PICTURE

BACKGROUND OF THE INVENTION

1. Field of the Invention

The present invention relates generally to computer graphics, and more particularly, to a system and method for computing desktop pictures.

2. Related Art

The desktop background of a computer generally includes the screen contents "underneath" any windows, folders, icons, and cursor/pointer, etc. The desktop is generally shown on the screen before any windows are opened, and reappears when-windows are closed or resized.

The desktop background may be configured to achieve a desired appearance. Controlling the appearance of the desktop allows a user to customize his or her computer. For example, the user may select a graphic from a web page as the desktop background (sometimes referred to as wallpaper). As another example, the user may select an image comprising a digital photograph stored in the user's computer memory as the desktop background.

Desktop pictures are typically drawn using an image stored in a picture file. Desktop pictures are static and take up considerable resources in RAM and VRAM (video RAM). In addition, because desktop pictures are static, transitions between the login screen and the desktop picture are generally abrupt and nonorganic.

SUMMARY OF THE INVENTION

Instead of loading a file that contains the desktop image, the present invention provides for a system and method for opening and retaining a procedural "recipe" and a small set of instructions that can be executed to compute a desktop picture. Because the recipe is so small, a series of keyframe recipes may be opened and retained.

When a part of the desktop image is needed to composite, that part may be computed using a fragment program on a GPU (graphics processing unit) using the procedural recipe and a specially written fragment program into a temporary VRAM buffer. After it is computed and composited, the buffer containing the result of the fragment program may be discarded.

Because the desktop picture is computed using a procedural recipe, the storage for the desktop picture can be eliminated. This includes both main memory (e.g., RAM) and video memory (e.g., VRAM) copies of the picture. Advantageously, using a procedural recipe to compute a desktop picture (or a portion thereof) allows the unused VRAM and RAM to be used for other operations.

Since on the systems and methods of the present invention reduce requirements for both VRAM and RAM, less memory is required. The movement of desktop images on demand allows a signature desktop "look" to be taken into the motion domain. The seamless integration between login, the desktop picture, and log out also provides a visual hook that can further distinguish products.

Also, since the desktop picture can be computed very quickly using a GPU, it may be made to move on demand. This includes movement, for example, when logging in, logging out, and transitioning to and from a screen saver, providing a seamless experience. It can also include slow movement, such as seen when a soft tree shadow is cast, with the gentle rustling of leaves in the breeze, or slow movement over time, or concerted movement to mark the passing of time (e.g., a noticeable change to pattern or color every hour). With an appropriate editing tool, designers can edit and specify the user experience.

Thus, the present invention provides systems and methods for computing a desktop picture, or a portion of a desktop picture. In certain embodiments of the present invention, a single frame may be computed. In other embodiments of the present invention, multiple frames may be computed. Furthermore, transitions between frames effectively provide movement of desktop pictures on demand.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION OF THE INVENTION

The inventive embodiments described herein may have implication and use in all types of multi-processor computing systems and, in particular, where differing types of processors are exploited in a system. Most of the discussion herein focuses on a common computing configuration having a CPU resource and a GPU resource. The discussion is only for illustration and not intended to confine the application of the invention to other systems having either: no GPU, multiple CPUs and one GPU, multiple GPUs and one CPU or multiple GPUs and multiple CPUs. With that caveat, we shall provide information regarding a typical hardware and software operating environment.

Figure 1:
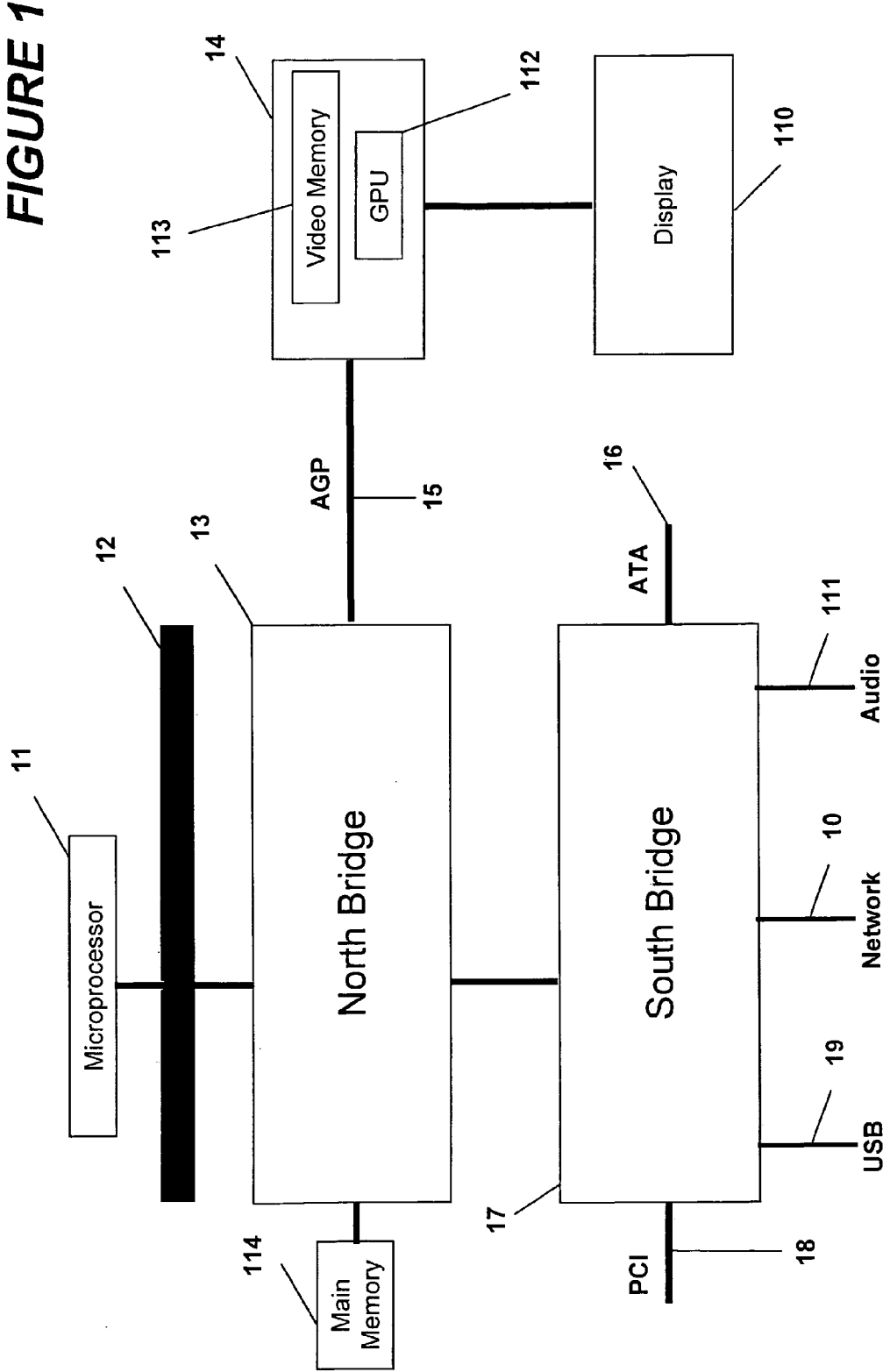
FIG. 1 depicts block diagram of an exemplary hardware configuration.

Reference is now made to FIG. 1, which depicts a common hardware computing configuration. FIG. 1 shows an exemplary block diagram, and it will be understood by those of skill in the art that numerous other configurations and devices can be used. Very generally, a microprocessor 11 is coupled to chipset support integrated circuits 13 and 17. The microprocessor may be any microprocessor or controller such as one of the Intel Pentium family or IBM/Motorola PowerPC chips. The chipset ICs (expressed here as North Bridge 13 and South Bridge 17) may be implemented in one or more ICs. The chipset 13, 17 generally couples to the microprocessor through a bus 12 or by direct links, which are well known in the art at this time. If the chipset 13, 17 is implemented in more than one IC, it is common for North Bridge functionality (AGP, memory management, etc.) to have a more direct connection to the processor by either connection to a common bus or the aforementioned links. A separate chip containing the South Bridge functionality is very commonly coupled to the microprocessor 11 through the North Bridge. However, we do not wish to preclude other configurations that exist now or may exist in the future. Some potential South Bridge functionality includes an ATA bus 16 for peripheral attachments such as disk drives; a PCI bus 18 for attachment of all manner of peripherals; a USB controller 19 for attachment of USB devices; a network interface controller 110 for supporting Ethernet or potentially other networks; and audio support 111. More relevantly, typical North Bridge functionality includes a memory controller to support main memory 114 and an accelerated graphics port (AGP) 15 for support of a video subsystem. Memory is typically any of a variety of types of dynamic random access memory, but may also, in alternative configurations be static RAM, magnetic memory, optical memory or any other suitable storage medium that exists or may exist in the future. AGP 15 is a special port placed in the chipset so that the graphics subsystem has rapid access to the system resources such as the microprocessor and main memory. There are various emerging flavors of AGP and certainly other methods to accelerate the speed of interaction between core resources and the graphics subsystem. For example, a PCI or PCIX bus may be used. This discussion is not intended to limit use to any particular method for performing similar functions.

A GPU 112 and a video memory 113 are provided in a graphics controller 14. A display 110 is connected to the graphics controller 14. The video memory 113 may comprise, for example, VRAM, WRAM, RDRAM, or SGRAM, etc. The display 110 may comprise, for example, an LCD screen, VGA or SVGA monitor, or any other suitable display screen device for displaying at least images. The display may be combined with the other components of FIG. 1 in a single unit, or may be a separate unit.

The GPU 112 may be a programmable GPU. Programmable GPUs have combined the speed advantage of prior GPUs with a significant measure of flexibility. In practical terms, programmability is an important advantage because it allows programs to use the graphics chip in ways similar to the system microprocessor. By using the GPU this way, the system can generate virtually infinite graphics effects without loading the system CPU.

Programmable GPUs run programs that are generally called fragment programs. The name "fragment" program derives from the fact that the unit of data being operated upon is generally a pixel—i.e., a fragment of an image. The GPUs can run a fragment program on several pixels simultaneously to create a result, which is generally referred to by the name of the buffer in which it resides. GPUs use data input generally called textures, which is analogous to a collection of pixels.

In accordance with certain embodiments of the present invention, rather than opening a file that contains a desktop image, the GPU 112 can be used to compute the desktop image for viewing on the display 110. Advantageously, this allows memory resources (e.g., main memory 114 and video memory 113) to be freed up and used for other operations. In addition, using the GPU to compute the desktop picture is very fast and extremely efficient, as will be discussed further below. Also, instead of a GPU, a DSP may be used to compute the desktop picture.

Figure 2:
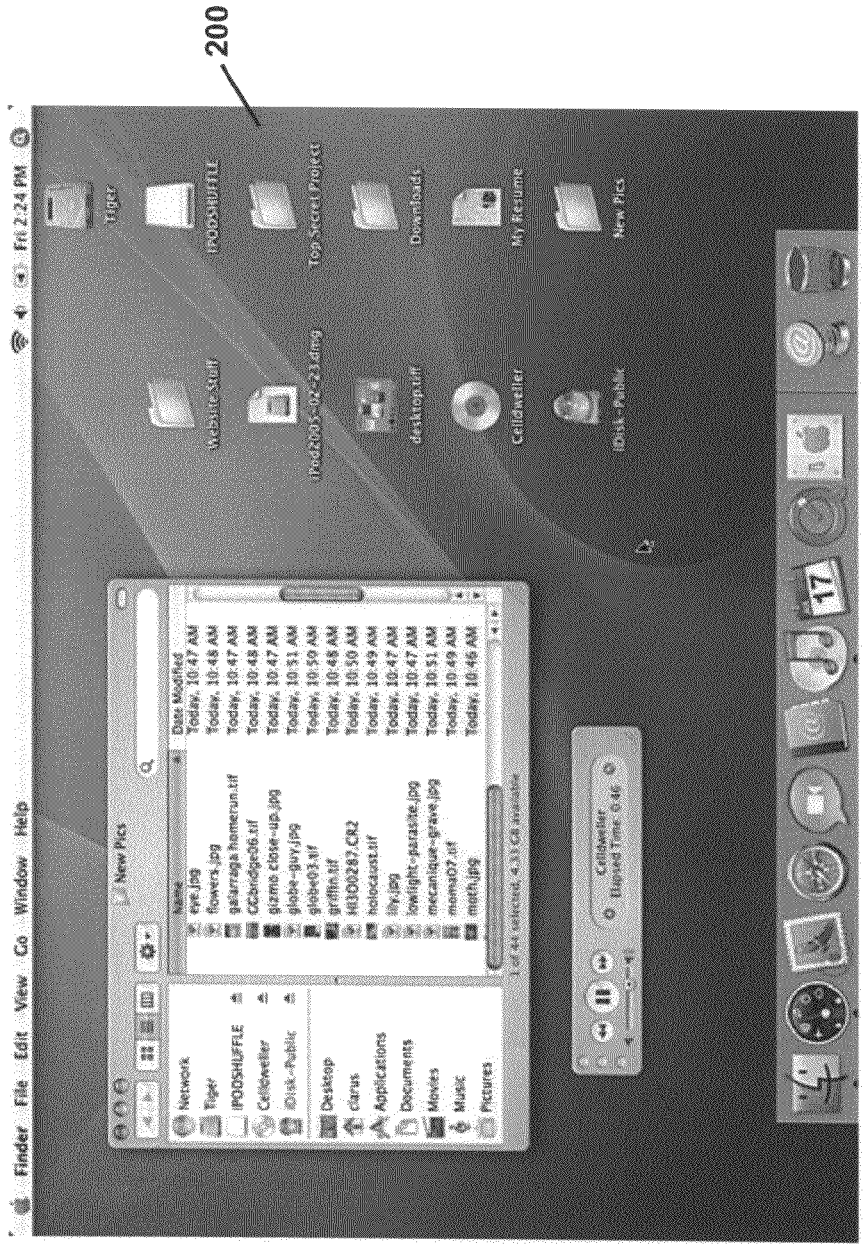
FIG. 2 depicts an exemplary computer desktop.

When an object such as a window, folder, icon, or cursor, etc., is displayed on the desktop, only a portion of the desktop picture is revealed. For example, in FIG. 2, only a portion of the desktop picture 200 is visible. In accordance with certain embodiments of the present invention, only the portion that is revealed is computed using a fragment program on the GPU 112 by using a procedural recipe and a specially written fragment program into a temporary VRAM buffer. In addition, the desktop picture may be selectively updated. That is, only the portion of the desktop that has changed, for example, due to moving or resizing of a window, is computed. Thus, rather than recomputing the entire desktop picture, the GPU 112 performs only the minimal computation necessary to update the desktop picture. Advantageously, doing so improves upon the prior art by saving time and resources.

When a part of the desktop image is needed to composite, that part is computed using a fragment program on a GPU using the procedural recipe and a specially written fragment program into a temporary VRAM buffer. After it is computed and composited, the buffer containing the result of the fragment program may be discarded.

The Assembly Buffer contains the portion of the screen that will change. Each element is drawn and loaded into the Assembly Buffer. In particular, only the part of the assembly buffer that needs to change will get drawn into. This means that only a minimal amount of the background needs to get computed when drawing into the Assembly buffer, because large, opaque windows obscure the desktop. The Assembly Buffer is later copied into the Frame Buffer. The Frame Buffer is directly drawn to the screen.

For purpose of illustration, the following is provided as one example of code for implementing a procedural description of a desktop. The following example comprises a GPU fragment program which takes a set of y-values and colors at those y-values and generates a continuous gradation of color that fills up a rectangular area. In this example, a cikernel Core Image fragment program for constructing a smooth gradation is used. Core Image is a software suite developed by Apple Computer, Inc. comprising many routines and functioning as, among other things, a high-level programming language or API (application programming interface) built for graphics functions but applicable to other functionality such as math alone (e.g., convolution operations). The Core Image API provides access to built-in image filters for both video and still images and provides support for custom filters and near real-time processing. Core Image is discussed in greater detail in co-pending and commonly owned application Ser. No. 10/825,694 filed on Apr. 16, 2004 and entitled SYSTEM FOR OPTIMIZING GRAPHICS OPERATIONS, which is hereby incorporated by reference in its entirety.

```
kernel vec4 gradation(float y1, float y2, float y3, float y4, __color color1,
__color color2, __color color3, __color color4)
{
    vec4 result, new;
    vec3 fracs;
    vec2 loc;
    loc = destCoord( );
    result = color1;
    fracs = (vec3(loc.y) – vec3(y1, y2, y3)) / (vec3(y2, y3, y4) –
vec3(y1, y2, y3));
    fracs = (3.0 – 2.0 * fracs) * fracs * fracs;
    new = mix(color1, color2, fracs.x);
    result = (loc.y > y1) ? new : result;
    new = mix(color2, color3, fracs.y);
    result = (loc.y > y2) ? new : result;
    new = mix(color3, color4, fracs.z);
    result = (loc.y > y3) ? new : result;
    result = (loc.y > y4) ? color4 : result;
    return result;
}
```

Figure 3:
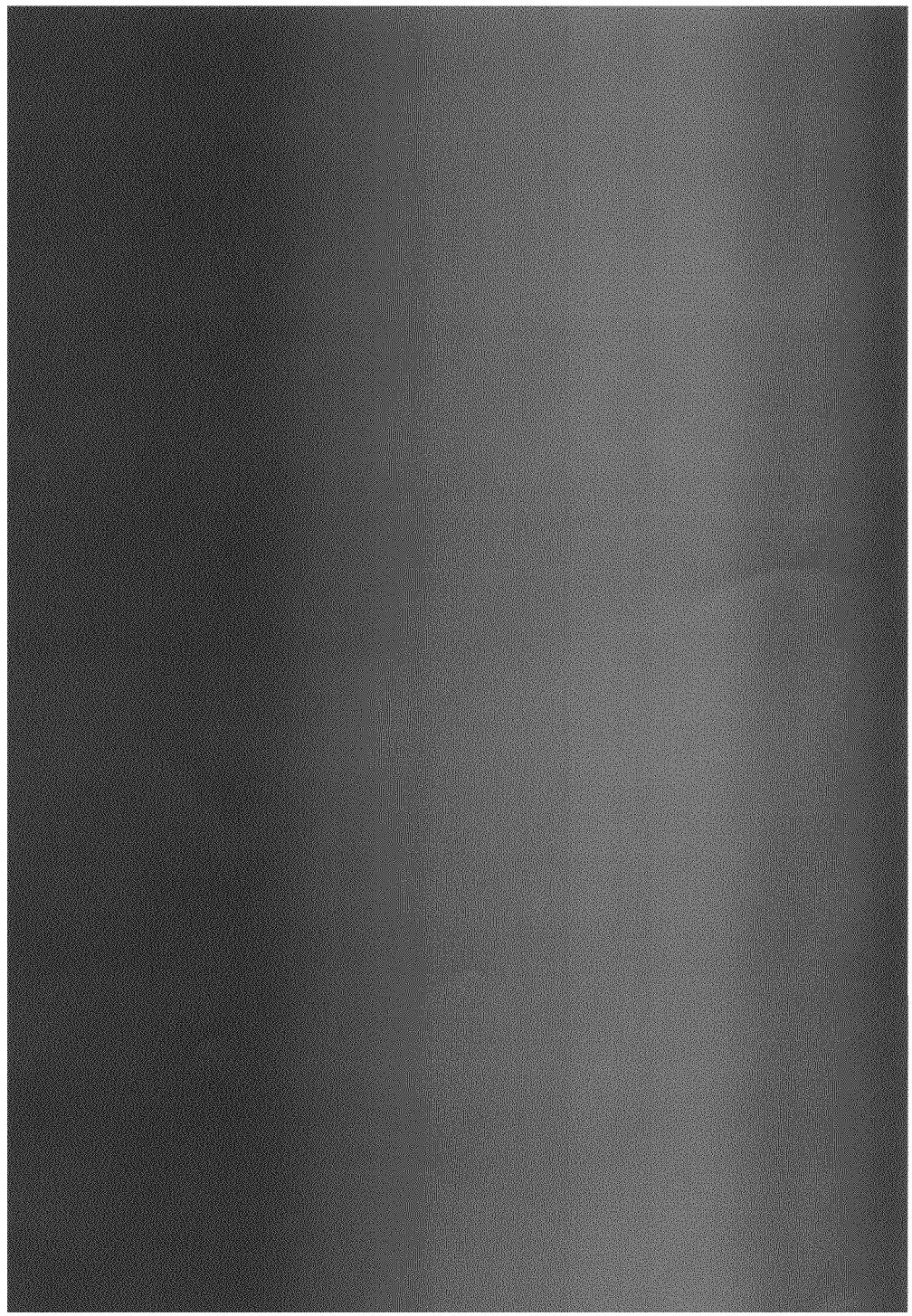
FIG. 3 depicts an example of a desktop image.

The color gradation in the above example can be made to simulate sky colors at a given time of day. The following is an example of a procedural recipe for computing a desktop picture, wherein the color gradation simulates the colors of a late sunset, as depicted in FIG. 3.

y1=0.0
y2=110.0
y3=206.0
y4=669.0
color1=(red: 0.635 green: 0.000 blue: 0.000)
color2=(red: 0.592 green: 0.318 blue: 0.137)
color3=(red: 0.424 green: 0.424 blue: 0.082)
color4=(red: 0.0 green: 0.176 blue: 0.325)

Figure 4:
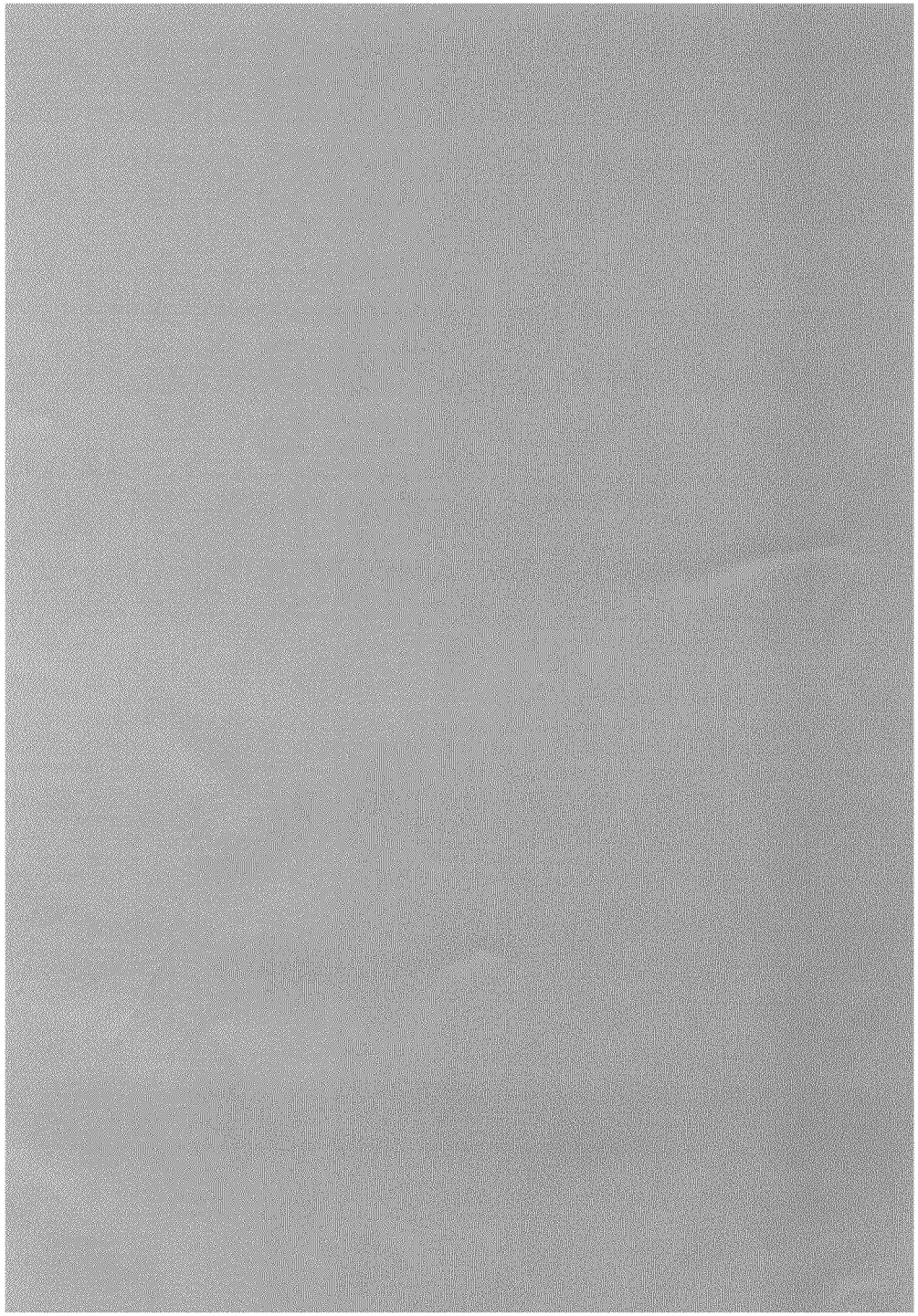
FIG. 4 depicts another example of a desktop image.

In accordance with one embodiment of the present invention, multiple desktop pictures may be computed based one one or more events. A seamless transition from one desktop picture to another may be used to simulate motion or animation. Referring to the above example code, several gradations may be computed over time. For example, the color gradation may be computed based on the time of day to mimic the changes in the colors of the sky. The following is an example of a procedural recipe for depicting a gradation of color to simulate a mid-day sky, resulting in the desktop picture depicted in FIG. 4.

y1=0.0
y2=110.0
y3=206.0
y4=669.0
color1=(red: 0.459 green: 0.7333 blue: 0.831)
color 2=(red: 0.467 green: 0.694 blue: 0.808
color 3=(red: 0.490 green: 0.675 blue: 0.843)
color 4=(red: 0.502 green: 0.631 blue: 0.953)

The values of the colors and positions may be changed over time, for example, and accordingly, the desktop picture will correspondingly change over time. A software tool may be used to allow a user to graphically edit and adjust the gradation. In addition, the tool may allow the user to pre-visualize the animation between the gradations. The software tool may have the capability for displaying and editing all procedural parameters of a keyframe, and the means for selecting between keyframes for individual keyframe edit. The software tool may also have the capability for previewing the transitions between the keyframes, either in real time, or in exaggerated time (as required to preview the slow transitions over time, or transitions marking the hours of a day). The software tool may also have the capability to open and save encapsulated procedural descriptions of the entire desktop animations in a compact form, the animations transitioning between any static endpoints (e.g., the login screen, the logout screen, and the initial desktop). The animation may be achieved by interpolating between the color components. In general, the procedural recipes should preferably be isomorphic (i.e., have a 1:1 correspondence) in order to interpolate between the two recipes smoothly. In this context, interpolation may be achieved using linear interpolation, cubic interpolation, Catmull-Rom interpolation, or any other well-known form of interpolation.

In the above example, the desktop picture is computed in real time and is changed based on the time of day. For example, the desktop picture may change to mark the hours of the day, perhaps changing color or pattern to indicate the time visually, but subtly. A variety of other types of events may be used to effect a change to the desktop picture. For example, the desktop picture may change upon a user event, such as launching a predetermined application. For instance, a particular desktop picture may be computed when the application iTunes® is launched; a different desktop picture may be computed when the application QuickTime® Player is launched. In addition, the desktop picture may change upon exiting a predetermined application. For example, upon exiting a particular application, the desktop picture may revert to the pervious desktop picture that was displayed just prior to the launching of that application.

As another example, the desktop picture may change after the computer is idle for a particular period of time. The desktop picture may also change when the computer comes out of an idle state. As yet another example, the desktop picture may change when transitioning to or from a screen saver.

Furthermore, the desktop picture may change upon login by a user. Further still, the desktop picture may change upon logging out by a user. Moreover, the desktop picture may be changed when transitioning between different users in fast user switching. Fast user switching allows switching between users on a single computer without requiring a user to quit all applications and log out.

In addition, the desktop picture may be changed upon a change in the user state. That is, where a computer system allows for more than one desktop, the desktop picture may change when transitioning between desktops.

As will be appreciated by those of skill in the art, the foregoing examples are provided as just a few examples of the many types of events that may be used to trigger a change in the desktop picture, and are not intended to be an exhaustive list. It will be appreciated that various other types of events may be used to trigger a change in the desktop picture and are within the scope of the present invention.

Furthermore, in the above example, the desktop picture comprises a linear gradation of color. It will be appreciated by those of skill in the art that many other types of desktop pictures may be computed in accordance with the principles of the present invention. For example, a non-linear gradation may be used. A technique for generating a complex gradient using multiple conics may be used, such as that described in commonly owned and co-pending application Ser. No. 11/113,658 filed on Apr. 25, 2005 and entitled MULTI-CONIC GRADIENT GENERATION, which is hereby incorporated by reference in its entirety.

As another example, the desktop picture may comprise a repeating pattern. In addition, various shapes may comprise the desktop picture. Furthermore, various filters such as those described in application Ser. No. 10/825,694 (e.g., distortion, checkerboard, spotlight, etc.) may be used to compute the desktop picture.

The foregoing examples are provided as just a few examples of the many types of desktop pictures that can be computed and are not intended to be exhaustive. It will be appreciated that a virtually infinite number of other types of desktop pictures may be computed and are within the scope of the present invention.

It should be understood that the inventive concepts disclosed herein are capable of many modifications. To the extent such modifications fall within the scope of the appended claims and their equivalents, they are intended to be covered by this patent.

The invention claimed is:

1. A method of computing a multicolor desktop background for display on a display device, the method comprising:
   loading a set of instructions and a first procedural description for computing a first image, wherein the first image comprises a plurality of pixels, wherein the first procedural description comprises instructions to compute color values of at least some of the plurality of pixels based on a time of day, wherein the first procedural description simulates a color gradient, and wherein the set of instructions and first procedural description comprise a fragment program; and
   executing, using one or more graphical processing units (GPUs), the fragment program on one or more of the plurality of pixels simultaneously to generate the first image,
   wherein the first image is used as at least part of a desktop background.

2. The method of claim 1, wherein a portion of the first image is computed.

3. The method of claim 1, further comprising:
   loading a second procedural description for computing a second image, wherein the second image comprises a second plurality of pixels, and wherein the set of instructions and second procedural description comprise a second fragment program; and executing, using the one or more GPUs, the second fragment program on one or more of the second plurality of pixels simultaneously to generate the second image, wherein the second image is used as at least part of the desktop background.

4. The method of claim 3, further comprising interpolating between the first procedural description and the second procedural description.

5. The method of claim 3, wherein the second procedural description is loaded after a predetermined period of time.

6. The method of claim 3, wherein the second procedural description is loaded upon occurrence of logging in of a user.

7. The method of claim 3, wherein the second procedural description is loaded upon occurrence of logging out of a user.

8. The method of claim 3, wherein the second procedural description is loaded upon occurrence of launching of a predetermined application.

9. The method of claim 8, wherein the predetermined application comprises a screen saver program.

10. The method of claim 3, wherein the second procedural description is loaded upon occurrence of exiting of a predetermined application.

11. The method of claim 10, wherein the predetermined application comprises a screen saver program.

12. The method of claim 3, wherein the second procedural description is loaded upon occurrence of change in a user state.

13. A method of computing a desktop background for display on a display device, the method comprising:

loading into one or more graphics processing units (GPUs) a set of instructions and a first procedural description for computing a first image, wherein the first image comprises a plurality of pixels, wherein the first procedural description comprises instructions to compute color values of at least some of the plurality of pixels based on a time of day, wherein the first procedural description simulates a color gradient, and wherein the set of instructions and first procedural description comprise a fragment program; and executing, by the one or more GPUs, the fragment program on one or more of the plurality of pixels simultaneously to generate the first image, wherein the first image is used as at least part of a desktop background.

14. The method of claim 13, further comprising:

loading into the one or more GPUs a second procedural description for computing a second image, wherein the second image comprises a second plurality of pixels, and wherein the set of instructions and second procedural description comprise a second fragment program; and executing, by the one or more GPUs, the second fragment program on one or more of the second plurality of pixels simultaneously to generate the second image, wherein the second image is used as at least part of the desktop background.

15. A computer readable medium having computer executable instructions and procedural descriptions for performing the method recited in any one of claims 1 or 13.

16. A system for computing a desktop background for display onto a display device, the system comprising:

a microprocessor; and one or more graphical processing units (GPUs) coupled to said microprocessor;

wherein a set of instructions and a first procedural description for computing a first image is loaded into the one or more GPUs, wherein the first image comprises a plurality of pixels, wherein the first procedural description comprises instructions to compute color values of at least some of the plurality of pixels based on a position of a respective pixel of the plurality of pixels being operated on by the set of instructions, wherein the first procedural description simulates a color gradient, and wherein the set of instructions and first procedural description comprise a fragment program; and wherein the one or more GPUs execute the fragment program on one or more of the plurality of pixels simultaneously to generate the first image, wherein the first image is used as at least part of a desktop background.

17. The system of claim 16, wherein a second procedural description for computing a second image is loaded into the one or more GPUs, wherein the second image comprises a second plurality of pixels, wherein the set of instructions and second procedural description comprise a second fragment program, wherein the one or more GPUs execute the second fragment program on one or more of the second plurality of pixels simultaneously to generate the second image, and wherein the second image is used as at least part of the desktop background.

18. A method of computing a desktop background for display on a display device, the method comprising:

loading a procedural function configured to receive input parameters and containing executable instructions defining a desktop background image effect into one or more graphical processing units (GPUs), wherein the defined desktop background image effect comprises an effect to compute color values of at least some of a plurality of pixels comprising the desktop background image based on a time of day, and wherein the procedural function simulates a color gradient;

providing a first recipe file defining a first set of input parameters to the procedural function;

executing, by the one or more GPUs, the procedural function to generate at least part of a first desktop background image; and rendering the first desktop background image to the desktop background.

19. The method of claim 18, further comprising:

providing a second recipe file defining a second set of input parameters to the procedural function;

executing, by the one or more GPUs, the procedural function to generate at least part of a second desktop background image; and rendering the second desktop background image to the desktop background.

20. The method of claim 19, further comprising interpolating between corresponding values of the first set of input parameters and the second set of input parameters.

* * * * *

UNITED STATES PATENT AND TRADEMARK OFFICE
CERTIFICATE OF CORRECTION

| | |
|---|---|
| PATENT NO. | : 8,793,576 B2 |
| APPLICATION NO. | : 11/251215 |
| DATED | : July 29, 2014 |
| INVENTOR(S) | : Zimmer et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this
First Day of December, 2015

Michelle K. Lee
*Director of the United States Patent and Trademark Office*